Patented May 27, 1941

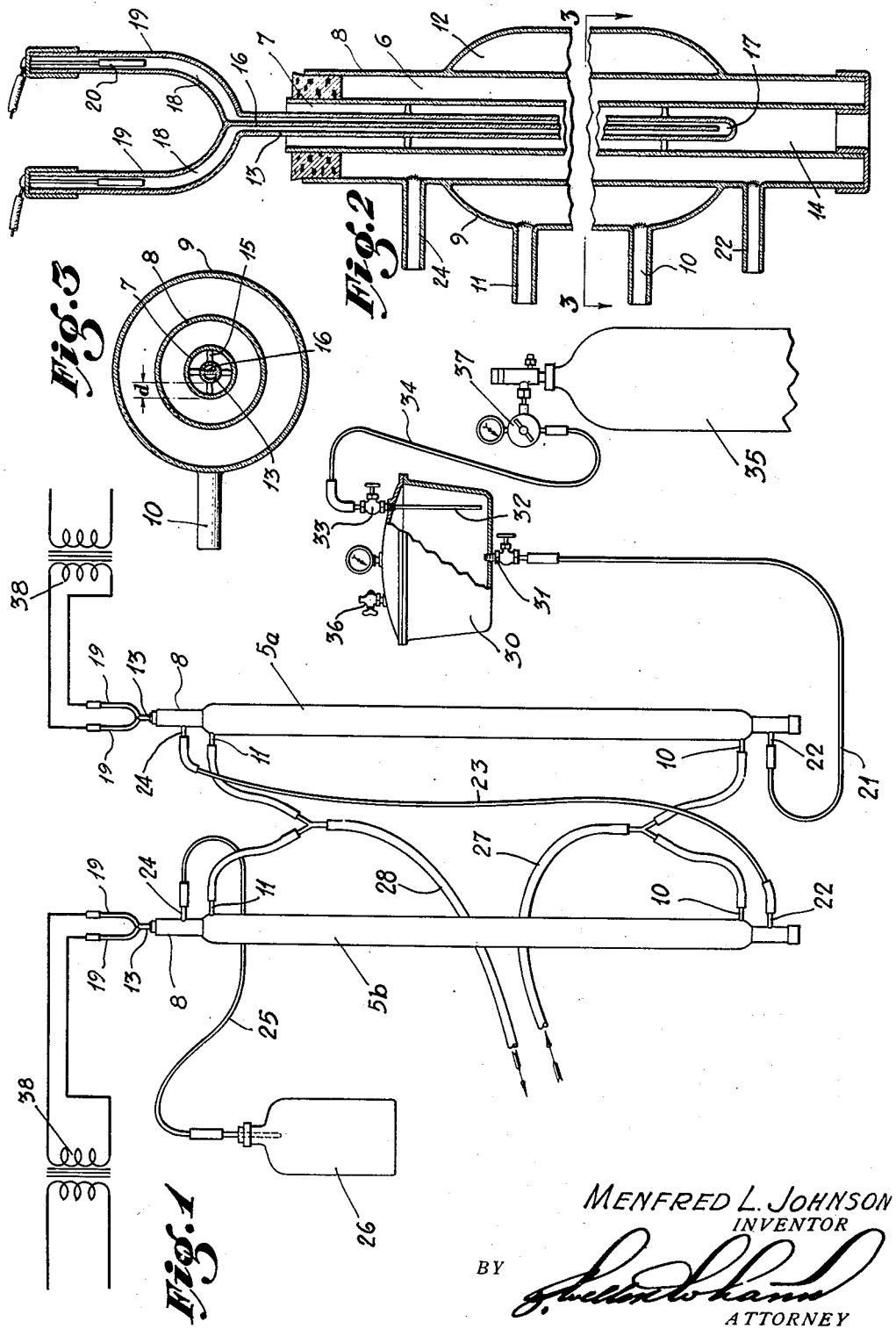

2,243,632

UNITED STATES PATENT OFFICE 2,243,632

SYNTHESIS OF VITAMIN D

Menfred L. Johnson, Glendale, Calif., assignor to Vitamin Technologists, Inc., Los Angeles, Calif., a corporation of California Application June 1, 1938, Serial No. 211,224

2 Claims. (Cl. 204—159)

My present invention relates to the art of converting or activating pro-vitamin D materials by irradiation with ultra-violet rays to produce or increase therein the anti-rachitic factors or to obtain synthesis of that quality known as vitamin D.

The invention has for its principal object to increase the effectiveness of efficiency of the conversion or activation of the pro-vitamin materials by the use of new procedure or new conditions in the irradiation thereof, whereby it is possible to greatly increase, and in some instances to quadruple, the activity or potency per unit weight of the vitamin D produced. For example, in practicing my new process in the irradiation of one form of pro-vitamin, I have increased the vitamin D activity of three million units thereof obtainable thereby by the most effective of the present processes known to me to be twelve million units per gram as the result of my new method. The invention also produces results of similar character in the irradiation of other pro-vitamin materials in the class thereof to which the present invention is directed.

It is an object of the present invention to provide a process for the irradiation of pro-vitamin materials, for synthesis of vitamin D, wherein the factors of time of exposure and distance of the provitamin material from the source of radiant energy, in the performance of the act or function of irradiation, are so balanced or proportioned, in a manner never before used and not suggested by the prior art, that the herein set forth increased anti-rachitic factors in given materials is readily and consistently obtainable.

It is an object of the invention to provide a process of the general character hereinbefore described wherein the pro-vitamin material is irradiated while in solution with a hydrocarbon spirit, and in such novel proportions that maximum efficiency in the production of vitamin D factor is produced.

It is a further object of the invention to provide a process for the irradiation of pro-vitamin materials wherein the substance consisting of or containing the pro-vitamin material or materials is irradiated in a condition substantially free from oxygen.

It is a further object of the invention to provide a process wherein the substance consisting of or containing pro-vitamin materials is first treated so as to displace the free oxygen content thereof and replace the same with an inert gas, such for example as $CO_2$, or one of the other inert gases to be hereinafter specified as being representative of a class of substance to be employed in the practice of the invention.

It is a further object of the invention to provide a process wherein the pro-vitamin material or materials are dissolved in a suitable liquid, or formed in or encountered in a suitable liquid solvent, and the solution thereof is then treated to displace the free oxygen content thereof, after which the solution having pro-vitamin content is subjected to irradiation in accordance with the present disclosure.

It is a further object of the invention to provide a process for the synthesis of vitamin D in a pro-vitamin material, in which the material to be treated, or a mixture or solution containing the same, is exposed to ultra-violet rays for a period of time ranging upwardly from about six minutes to approximately sixty minutes, and at a distance from the source of radiant energy less than two inches.

It is my present conviction that optimum results are obtainable when the time of exposure is maintained at about forty-five minutes and the distance of the pro-vitamin material from the source of ultra-violet rays is very close to zero, highly satisfactory results being obtained at a distance of about 5 mm. from the source of radiant energy.

Further objects and advantages of the invention will be brought out in the following part of the specification.

Referring to the drawing, which is for illustrative purposes only:

Fig. 1 is a somewhat schematic view showing a simple form of apparatus forming a part of the invention, and by which the process may be practiced.

Fig. 2 is a fragmentary, condensed view showing one of the irradiation units of Fig. 1, this view being sectioned so as to clearly disclose the inner parts.

Fig. 3 is a cross-section taken on a plane represented by the line 3—3 of Fig. 2.

In the apparatus shown in Fig. 1, I employ two irradiating units 5, respectively identified as 5a and 5b, which are connected in series so as to provide fluid passages of suitable length for the proper treatment of certain types of pro-vitamins. As shown in Fig. 2, each of the units 5 includes a passage 6, the inner wall 7 of which is formed by a quartz tube having the ability to pass or transmit violet rays, and the outer wall 8 of which may consist of a tube of suitable heat transmitting ability. In small apparatus this tube 8 may be of glass. To provide cooling means, especially where the apparatus is to be used in the treatment of pro-vitamins in solutions of volatile solvents, a shell 9 is placed around the major portion of the tube 8 and inlets and outlets 10 and 11 are provided at the ends thereof so that a refrigerant may be circulated through the space 12. A cold quartz tube ultra-violet generator 13 is extended within the opening 14 of the quartz tube 7, and is held in coaxial position therein by means of fins 15 which project outwardly from the tube 13. Cold quartz generators are well known in the art, and produce ultra-violet rays of a wave length of from 2536 to 2540 Angstrom units. The cold quartz tube 13, which I have shown for the purpose of illustration, has a central dividing wall 16, a gas passage 17 which extends across the lower end of the dividing wall 16 and up both sides thereof, the upper extremities being connected to passages 18 formed in branch arms 19 which carry electrodes 20.

As shown in Fig. 1, the units 5a and 5b are placed in consecutive order. A supply tube 21 is connected to an inlet 22 leading into the space 6 of the element 5a, a transfer tube 23 connects the outlet 24 of the element 5a with the inlet 22 of the element 5b, so that fluid may pass from the space 6 of the element 5a into the lower end of the space 6 of the element 5b, and the outlet 24 of the element 5b is connected by means of a discharge tube 25 with a suitable receiver 26 for the treated product. The outlet of the tube 25 has an orifice or opening of reduced size so as to produce a back pressure on the fluid which assists in controlling the time of flow of the fluid through the units 5a and 5b. A refrigerant supply tube 27 is connected to the inlets 10 leading into the spaces 12 of the units 5a and 5b, and a waste tube 28 is connected to the outlets 11. For the storage of a material for treatment in the elements 5a and 5b a chamber 30 is provided, the outlet 31 of which is connected to the delivery tube 21. A gas supply nozzle 32 is extended down into the chamber 30 and gas is fed thereto through a valve 33 which is connected by means of a tube 34 with a $CO_2$ gas supply tank 35.

The apparatus shown in Fig. 1 is especially suited for the irradiation of pro-vitamin materials of the class which includes ergosterol, yeast, cholesterol, vegetable, or animal oil or other pro-vitamin materials which may be dissolved in a suitable vehicle. The desired material, or a compound or mixture thereof, is first dissolved in a suitable solvent, and the solution is placed in the chamber 30. As a specific example of the performance of the process, I shall cite ergosterol as the starting material, for the reason that this pro-vitamin is of known value. The ergosterol is first dissolved in ether to form a solution having one-half to one percent of ergosterol therein. The solution is then placed in the chamber 30, which will at this time be substantially closed except for the valve 36, which is at this time opened and the outlet valve 31 of the chamber 30 is closed. Gas from the tank 35 is then fed through the nozzle 32 so that it will bubble up through the solution and displace free oxygen therefrom, replacing at least a part of the displaced oxygen with $CO_2$. When this phase of the treatment of the solution is completed, valve 36 is closed, so that the solution will be held in the chamber 30 under the pressure applied by the gas from the container 35, under control of regulator 37.

The ultra-violet generators 13 of the units 5a and 5b are then energized from transformers 38, a refrigerant such as cooled water at a temperature of 20° C. is circulated through the spaces 12, and the valve 31 is opened to permit a controlled flow of the pro-vitamin solution through the tube 21 and through the treating spaces 6 of the elements 5a and 5b to the receiver 26. The flow of the solution is regulated so that the same will be exposed to ultra-violet rays emanating from the generators 13 for a period of time ranging upwardly from five and one-half minutes and preferably not exceeding one hundred twenty minutes. This time of exposure, to obtain optimum results in the treatment of a selected pro-vitamin, may be determined by test. For the material used here as an example, namely, ergosterol, I find that highest vitamin D activity per unit weight therein is obtained by an exposure to the ultra-violet emanations for approximately forty-five minutes and at a distance from the source of ultra-violet of approximately $\frac{3}{16}$ of an inch. Accordingly, in the specific apparatus disclosed, I have made the distance $d$ about $\frac{3}{16}$ of an inch. This distance $d$, however, may vary between substantially zero and 2 inches, in accordance with the teachings of my invention. It will be understood, therefore, that although improved results are obtainable by the practice of the process within the range given, the specific values of time and distance within these limits for each different source of pro-vitamin D material may be readily determined.

In the treatment of ergosterol, as hereinbefore described, for the synthesis of vitamin D therein, an exposure of the solution containing the ergosterol of fifteen minutes at a distance of approximately $\frac{3}{16}$ of an inch showed a vitamin D activity in the irradiated ergosterol of one-half the potency per unit weight of material as when the time of exposure was increased to thirty minutes, and showed a vitamin D activity of one-third the potency per unit weight of material as when the time of exposure was increased to forty-five minutes. When the exposure was continued beyond forty-five minutes, a reversion or destruction of the vitamin D factors resulted, somewhat in proportion to the increase of time above ninety minutes.

I claim as my invention:

1. A method of producing or increasing vitamin D in ergosterol comprising: forming a solution of ergosterol in ether, the solution having ½ to 1% of ergosterol therein; and exposing said solution to the action of ultra-violet light, about 90% of which is in the range of 2536 to 2540 Angstrom units, at a distance therefrom of approximately three-sixteenths of an inch and for a period of time of approximately forty-five minutes.

2. A method of producing or increasing vitamin D in ergosterol comprising: forming a solution of ergosterol in ether, the solution having not more than 1% of ergosterol therein; and exposing said solution to the action of ultra-violet light, about 90% of which is in the range of 2536 to 2540 Angstrom units, at a distance therefrom of approximately three-sixteenths of an inch and for a period of time of approximately forty-five minutes.

MENFRED L. JOHNSON.